(12) United States Patent
Hamaguchi et al.

(10) Patent No.: US 7,486,485 B2
(45) Date of Patent: Feb. 3, 2009

(54) PERPENDICULAR HARD DISK DRIVE RESISTIVE AGAINST EXTERNAL MAGNETIC FIELD

(75) Inventors: Takehiko Hamaguchi, Kanagawa (JP); Yoshihisa Kamo, Tokyo (JP); Hideaki Maeda, Kanagawa (JP); Yukiya Shimizu, Kanagawa (JP); Ikuya Tagawa, Kanagawa (JP); Tetsuo Yuki, Kanagawa (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 575 days.

(21) Appl. No.: 11/262,531

(22) Filed: Oct. 28, 2005

(65) Prior Publication Data

US 2006/0092556 A1    May 4, 2006

(30) Foreign Application Priority Data

Oct. 28, 2004  (JP) .............................. 2004-313711

(51) Int. Cl.
*G11B 5/127* (2006.01)
(52) U.S. Cl. ..................................................... 360/317
(58) Field of Classification Search ................. 360/317, 360/125.06, 123.06, 123.12, 123.05
See application file for complete search history.

(56) References Cited

U.S. PATENT DOCUMENTS

| | | | |
|---|---|---|---|
| 6,710,972 B1 * | 3/2004 | Mochizuki et al. ..... | 360/123.05 |
| 6,791,796 B2 * | 9/2004 | Shukh et al. ............ | 360/125.12 |
| 7,145,750 B2 * | 12/2006 | Kimura et al. .......... | 360/125.04 |
| 7,180,704 B2 * | 2/2007 | Mochizuki et al. ..... | 360/123.12 |
| 2002/0036871 A1 * | 3/2002 | Yano et al. .............. | 360/317 |
| 2004/0159012 A1 * | 8/2004 | Kawato et al. .......... | 360/126 |
| 2005/0207061 A1 * | 9/2005 | Mochizuki et al. ..... | 360/123 |
| 2005/0213244 A1 * | 9/2005 | Mochizuki et al. ..... | 360/123 |
| 2006/0002018 A1 * | 1/2006 | Fukui et al. ............. | 360/125 |
| 2006/0082931 A1 * | 4/2006 | Fukui et al. ............. | 360/317 |

FOREIGN PATENT DOCUMENTS

| | | |
|---|---|---|
| JP | 05-210826 | 8/1993 |
| JP | 06-084120 | 3/1994 |
| JP | 07-307002 | 11/1995 |
| JP | 2002-197619 | 7/2002 |
| JP | 2003-045008 | 2/2003 |
| JP | 2003-077266 | 3/2003 |
| JP | 2004-047110 | 2/2004 |
| JP | 2004-095177 | 3/2004 |

* cited by examiner

*Primary Examiner*—Allen T Cao
(74) *Attorney, Agent, or Firm*—Townsend and Townsend and Crew LLP; Rambod Nader

(57) ABSTRACT

Embodiments of the invention prevent a decrease in magnetization or demagnetization from occurring to recording magnetization regardless of a direction in which a stray field is applied. In one embodiment, an apparatus for data storage system comprises a head having a magnetic field shield in the vicinity of a main pole, and a cover of the device, using a constituent material with a magnetic field shielding effect, across the cover, or at part thereof. When a stray field in a direction perpendicular to a recording medium is applied, the effect of the magnetic field is alleviated by the magnetic field shield installed in the vicinity of the main pole. In such a case, it need only be sufficient to form the magnetic field shield in a shape optimum for removing the stray field in the perpendicular direction only. When a stray field in a direction horizontal in relation to the recording medium is applied, the magnetic field acting on the recording medium is removed by the cover of the device comprising a magnetic component.

20 Claims, 12 Drawing Sheets

Fig. 7
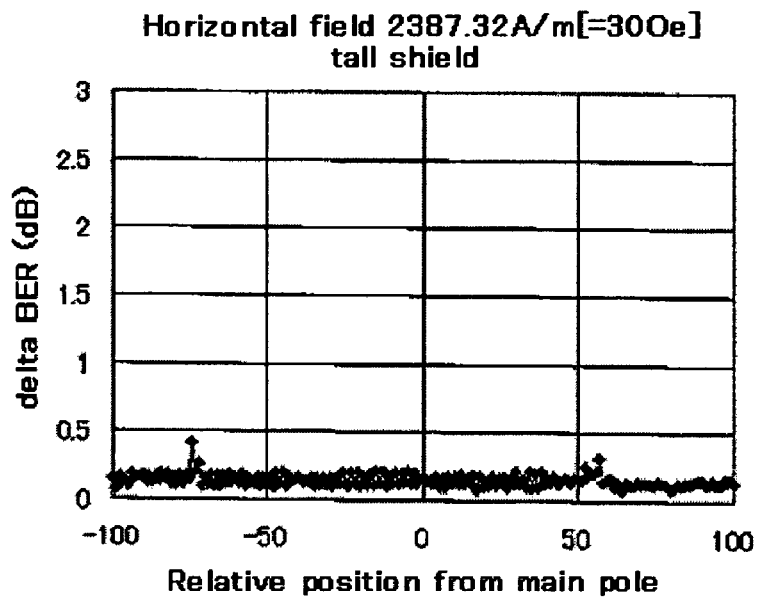
(A) Influence of read shield which is long for vertical direction
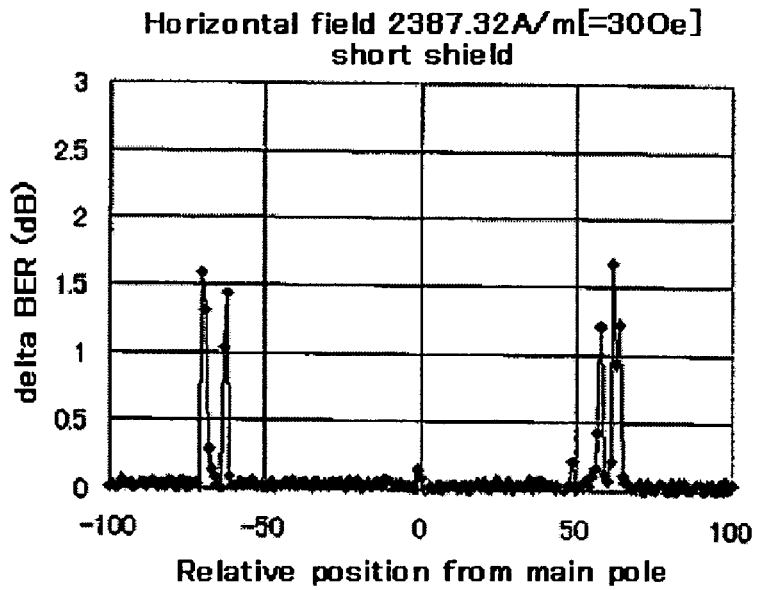
(B) Influence of read shield which is short for horizontal direction Fig. 17
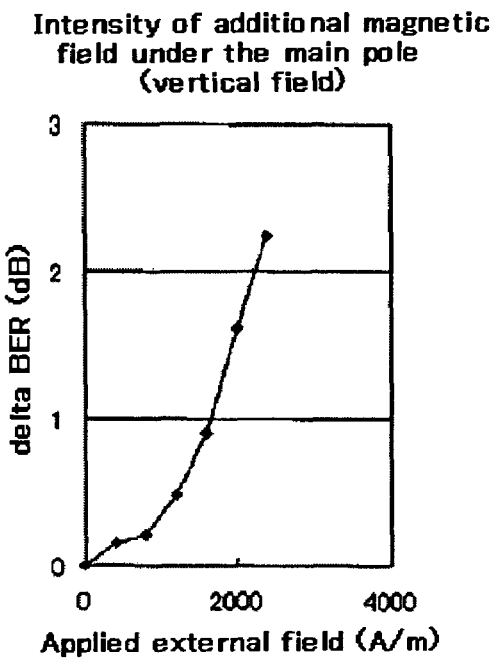
(A) Applied external field for vertical direction
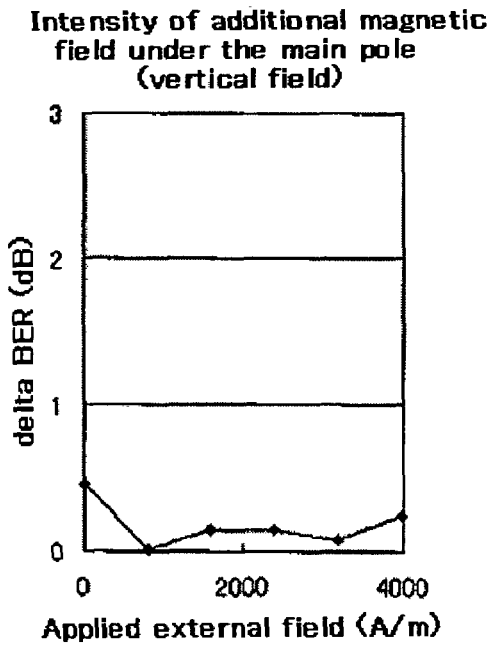
(B) Applied external field for horizontal direction Fig. 18
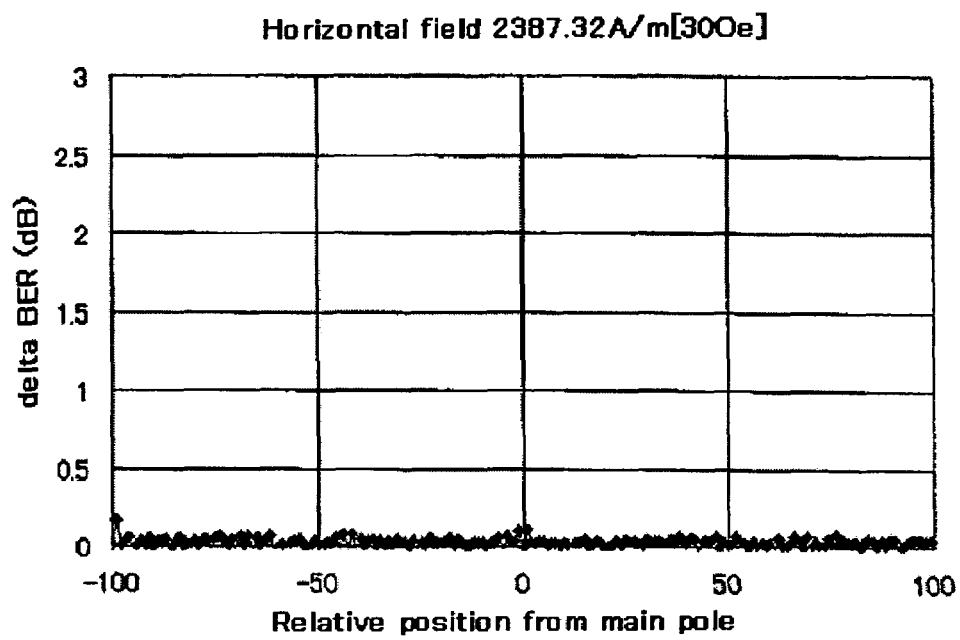
(A) Applied external field for vertical direction
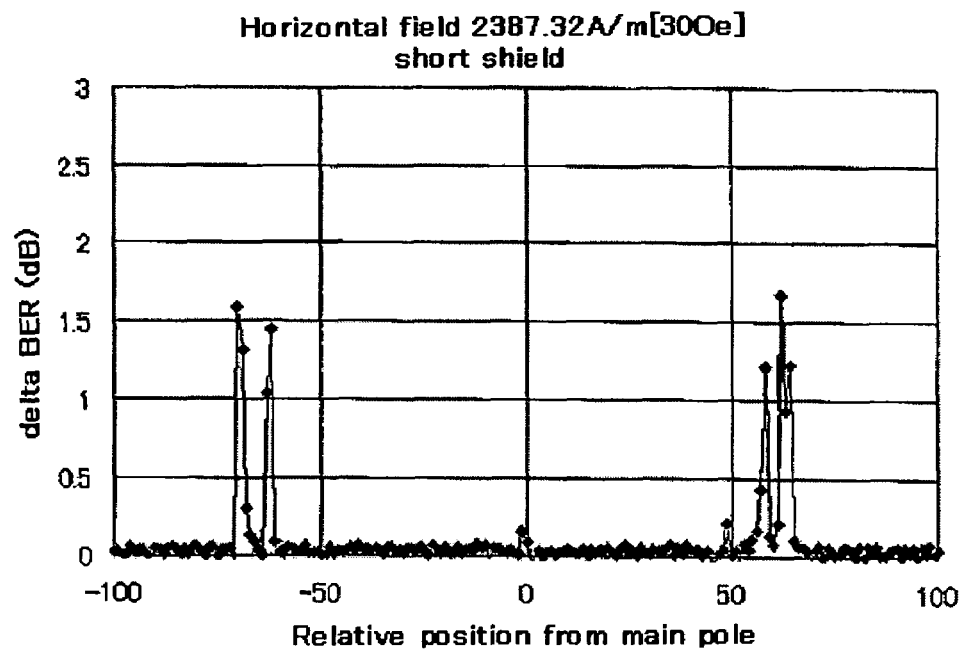
(B) Applied external field for horizontal direction

PERPENDICULAR HARD DISK DRIVE RESISTIVE AGAINST EXTERNAL MAGNETIC FIELD

CROSS-REFERENCES TO RELATED APPLICATIONS

This application claims priority from Japanese Patent Application No. JP2004-313711, filed Oct. 28, 2004, the entire disclosure of which is incorporated herein by reference.

BACKGROUND OF THE INVENTION

The present invention relates to an apparatus for data storage system for recording signals as magnetization in the direction of thickness of a magnetic recording medium, and magnetically reading the signals.

The conventional recording technology is described hereinafter by taking an example of a perpendicular magnetic hard-disk drive. The perpendicular magnetic hard-disk drive refers to a magnetic hard-disk drive comprising a perpendicular recording medium, a read-write head, and so forth, for executing read-write by means of a perpendicular magnetic recording system. The perpendicular magnetic recording system is a system in which recording magnetization is formed in the direction of thickness of a medium in contrast to the conventional longitudinal recording system.

In FIG. 13, a perpendicular recording medium 13 has a recording layer 131 having magnetic anisotropy in the direction of thickness thereof. There are a single-layer recording medium having the recording layer 131 only, and a multilayer recording medium having a soft under layer 132 between the recording layer 131 and a board 133 (the recording medium hereinafter refers to the multilayer recording medium unless explicitly described otherwise). The recording layer 131 is made up of a perpendicularly magnetized film having high coercivity in order to retain information, and the soft under layer 132 has a property of undergoing magnetization when a magnetic field is applied thereto while reverting to a non-magnetized state when the magnetic field is removed. For a read-write head 140, use is generally made of a read-write-separation type head, comprising a recording element and a reading element. The recording element includes a ring type head in a ring-like shape, provided with a gap in a part thereof, for executing recording with a leakage magnetic field from the gap, for use in the longitudinal recording system as well, and a single pole type (SPT) magnetic head comprising a main pole, and an auxiliary pole (a write head hereinafter referred to as the SPT magnetic head unless explicitly described otherwise). Further, for the reading element, use is made of a magneto-resistive (MR) head capable of detecting changes in a magnetic field as changes in resistance.

Now, taking an example of a case where the SPT magnetic head 140 is combined with the multilayer recording medium 13, recording operation is broadly described hereinafter. A main pole 141 is magnetized by a magnetic field generated by a current flowing through coils 143 wound around the upper part of the recording element. Because an area of the tip of the main pole, facing the medium, is small, magnetic fluxes 50 converge thereon, so that a very large magnetic field is generated directly underneath the main pole, thereby effecting recording. The magnetic field penetrating through the recording layer 131 magnetizes the soft under layer 132. Meanwhile, an auxiliary pole 142 is magnetized by the magnetic field generated by the coils, in a direction opposite from the direction of the main pole 141, however, because an area of the tip of the auxiliary pole 142 is large, a magnetic field generated is small, and no recording is implemented. However, since the magnetic field in the direction opposite from the direction of the main pole is produced in the soft under layer, directly underneath the auxiliary pole, a magnetic field joining a portion of the soft under layer, directly underneath the main pole, with the portion thereof, directly underneath the auxiliary pole is formed in the soft under layer. At this point in time, a recording magnetic field 50 constitutes a path leading from the main pole to the auxiliary pole via the soft under layer. The MR head is provided with a MR element 146 sandwiched between upper and lower read shields 144, 145.

As shown in FIG. 14, in the case where a stray field 51 in a direction perpendicular to the surface of a medium is applied to such a recording system as described, the stray field 51 passes through the main pole, and the auxiliary pole. In such a case, because of the structure of the main pole 141, the stray field converges (511) on the tip of the main pole, so that there can occur a case where a magnetic field so strong as to cause decrease or demagnetization to occur to recording magnetization of the recording layer 131 is produced even when the stray field 51 applied from outside is weak. This is a phenomenon called decrease in recording magnetization or demagnetization of recording magnetization by the agency of a stray field. If this phenomenon occurs, not only recorded information is lost, but also even a servo-mark and identification signals for tracks and sectors are lost in the extreme case, thereby raising a possibility of causing interference with operation of a hard disk drive (HDD) itself.

There have been long recognized problems occurring when a stray field in a direction perpendicular to a recording medium is applied. With reference to the problems, a method of increasing resistance to a stray field by disposing a member having a magnetic shielding effect in a plane region of a HDD case opposite to a moving range of a magnetic head, and in side-face regions thereof connected to the plane region, has been disclosed in, for example, JP-A No. 77266/2003. Further, a technology whereby a member having a magnetic shielding effect is used not only in a moving range of a magnetic head but also on the whole surface of a HDD case has been disclosed in JP-A No. 95177/2004. In JP-A No. 197619/2002, there has been disclosed a technology for shielding a stray field by covering a main pole of a SPT magnetic head with a member having a magnetic shielding effect. In JP-A No. 47110/2004, there has been disclosed a method for shielding a stray field by covering a medium with a magnetic component in a shape resembling the letter U, disposed on a side of a spindle, opposite from a head. Further, other technologies have been disclosed in JP-A No. 210826/1993, JP-A No. 307002/1995, JP-A No. 84120/1994, and JP-A No. 45008/2003, respectively.

BRIEF SUMMARY OF THE INVENTION

A method of installing a member having the magnetic shielding effect on a HDD case is not always applicable in practice to a HDD for use in portable equipment, in particular, from the viewpoint of constraint on weight and size, since there is the need for covering the HDD case with a member made of a soft magnetic material of not less than a predetermined thickness in order to obtain a generally sufficient magnetic shielding effect. This is obvious from results of experiments, shown in FIG. 15. FIG. 15 shows results of measurements taken on a magnetic field inside a case of a 2.5 type HDD currently available in the market. Even in the case of installing a magnetic cover (in this case, a steel sheet 0.4 mm thick was used), there was found hardly any effect on the magnetic field inside the case in comparison with a normal aluminum cover, and a magnetic field on the order of 3580.99 A/m (=45 Oe) was observed against a magnetic field of 3978.87 A/m (=50 Oe), applied in the perpendicular direction. Thus, it is obvious that thickness several times as thick as that of the magnetic cover is required in order to obtain a sufficient magnetic shielding effect.

Incidentally, the problems occurring when a stray field in the perpendicular direction is applied to a recording medium have been long recognized; however, problems occurring when the stray field is applied in parallel with the surface of the recording medium have not been recognized. FIG. 16 is a schematic representation for explaining this problems, FIG. 16(A) is a schematic plan view as seen from the direction perpendicular to the air bearing surface, and FIG. 16(B) is a schematic sectional view taken on line A-A in FIG. 16(A).

As shown in FIG. 16, when a stray field 51 is applied in the horizontal direction in relation to a recording medium 13, a soft under layer 132 of the recording medium 13 is subjected to the effect of the stray field 51 to be thereby magnetized in the orientation of the stray field 51. If a stray field strength is so strong as to cause the soft under layer 132 to have a magnetic field for saturation, saturated magnetic fluxes tend to pass through paths penetrating through other magnetic materials. In such a case, when respective levitation surfaces of magnetic components, such as an auxiliary pole 142, upper and lower read shields 144, 145, and so forth, come to be substantially parallel with the orientation of the stray field, the magnetic field for saturation in the soft under layer 132 forms a path passing through the recording medium 13, and returning to the soft under layer 132 via the auxiliary pole 142. Thus, because portions of the magnetic field, so strong as to cause saturation in the soft under layer 132, pass through the recording medium 13, magnetization of the recording medium 13 is caused to attenuate in regions 512 directly underneath the respective ends of the auxiliary pole 142, thereby raising a possibility of causing interference with operation of the hard disk drive (HDD) itself as with the case where the stray field is applied in the direction perpendicular to the recording medium as shown in FIG. 14.

As described above, the problems that occur due to application of the stray field will largely vary depending on a direction in which the stray field is applied. This point is definitely proven by conducting experiments for checking effects when the stray field is applied, using a HDD adopting the perpendicular recording system. Referring to results of the experiments, shown in FIGS. 17, and 18, there are described hereinafter variations in the state of deterioration of a recording magnetic field, depending on the orientation of the stray field. FIG. 17 shows results of measurements taken on variation in error rate between before and after application of a stray field by keeping a main pole fixed on a certain track, and levitated during the experiments for checking the effect of the stray field, directly underneath the main pole. FIG. 18 shows results of measurements taken on variation in error rate between before and after application of the stray field by repeating recording at the center track while a stray field of 2387.32 A/m {=30 Oe (oersted)} is applied during the experiments for checking the effect of the stray field, in the vicinity of the main pole.

FIGS. 17A, and 18A show the results of the measurements when the stray field is applied in the direction perpendicular to the recording medium. As described with reference to FIG. 14, in which a relative position of the head is at 0, it is obvious that a decrease in magnetization or demagnetization, such as deterioration in amplitude, or an increase in error rate, and so forth, occurs to the recording magnetization, directly underneath the main pole. On the other hand, FIGS. 17B, and 18B show the results of the measurements when the stray field is applied in the horizontal direction in relation to the recording medium. As described with reference to FIG. 16, the magnetic field, having reached saturation in the soft under layer of the recording medium by the agency of the stray field applied in the horizontal direction, flows into the auxiliary pole 142 of the SPT magnetic head, or the upper and lower read shields 144, 145, so that a decrease in magnetization or demagnetization, such as deterioration in amplitude, or an increase in error rate, and so forth, occurs to the recording magnetization, directly underneath the respective ends of the auxiliary pole 142, and the upper and lower read shields 144, 145. It has not been known thus far that a process in which a decrease in magnetization or demagnetization takes place will largely vary in such a way as described depending on the orientation of the stray field. As a result, with the conventional technologies for coping with the stray field, disclosed thus far, attention has been focused on only a case where the stray field is applied in the direction perpendicular to the recording medium.

In JP-A No. 197619/2002, although the orientation of the stray field is not explicitly described, it is deemed, in consideration of problems raised, and effects, that only a case where the stray field is applied in the direction perpendicular to the medium is assumed. This is obvious from the fact that there is shown formation of the same magnetic circuit as that in the case of recording data by the agency of the stray field, and consideration is given to the effect of the stray field, directly underneath the main pole. With the other conventional technologies as well, assumption is made on the case where the stray field is applied in the direction perpendicular to the recording medium in the case of the perpendicular magnetic recording system while no assumption is made on a decrease in magnetization or demagnetization, occurring to the recording magnetization, directly underneath the respective ends of the auxiliary pole and the read shields, when the stray field is applied in the horizontal direction.

Now, with respect to the conventional technologies, effects thereof when the stray field was applied in the horizontal direction in relation to the recording medium were found by conducting experiments. With the technologies disclosed in JP-A No. 77266/2003, JP-A No. 95177/2004, and so forth, it was not possible to obtain satisfactory effects in the case where the stray field was applied in the direction perpendicular to the recording medium. However, in the case where the stray field was applied in the horizontal direction, it was possible to cause the magnetic field applied to the soft under layer of the recording medium to take a detour toward the cover, thereby significantly alleviating effects at the respective ends of the auxiliary pole and the read shields.

In contrast, it is regarded that the technologies, disclosed in JP-A No. 197619/2002, and so forth, have satisfactory effects in the case where the stray field is applied in the perpendicular direction since formation of a magnetic circuit by the main pole, the auxiliary pole, and the soft under layer is blocked. However, those technologies are incapable of coping with a decrease in magnetization or demagnetization, occurring to the recording magnetization, directly underneath the respective ends of the auxiliary pole and the read shields, when the stray field is applied in the horizontal direction. In addition, depending on sizes of the shields, and installation locations thereof, the shields themselves create a cause for inducing a decrease in magnetization or demagnetization, occurring to the recording magnetization.

With the method disclosed in JP-A No. 47110/2004, it is possible to lessen the stray field flowing into the soft under layer, but a satisfactory shielding effect cannot be obtained directly underneath the head. Further, if the magnetic field is applied from a side of the spindle, opposite from the magnetic component (from the head side), the magnetic component acts as an antenna for the stray field, thereby raising a possibility of creating a cause for inducing the stray field toward the head. With a method disclosed in JP-A No. 210826/1993, magnetic fields making no contribution to writing and reading, such as the stray field, and so forth, are shielded by covering a slider in whole, including the main pole, and the auxiliary pole, with a magnetic shielding film. However, in the case of the magnetic shielding film extending up to a surface, opposite to a medium, the magnetic fields are caused to converge at both ends of the magnetic shielding film. In the case of the magnetic shielding film being recessed from the surface, opposite to the medium, effects of the stray field, directly underneath the respective ends of the auxiliary pole and the read shields, are unavoidable as with the case of JP-A No. 197619/2002.

A method disclosed in JP-A No. 307002/1995 does not take into consideration the problems unique to the perpendicular magnetic recording system. Supposing that a head core is replaced with the main pole, the stray field applied in the direction perpendicular can be eliminated, however, against the stray field applied in the horizontal direction, the effects of the stray field, directly underneath the respective ends of the auxiliary pole and the read shields, are unavoidable as with the case of JP-A No. 197619/2002, because the magnetic shielding film is recessed from the surface, opposite to the medium. Next, a method disclosed in JP-A No. 84120/1994 does not take into consideration the problems unique to the perpendicular magnetic recording system either. Supposing that the method is applied to the perpendicular magnetic recording system, the problems with the stray field applied in the perpendicular direction can be eliminated by the effect of the magnetic shielding as with the case of JP-A No. 210826/1993, however, against the stray field applied in the horizontal direction, the effects of the stray field, directly underneath the ends of the magnetic shielding, are unavoidable.

A case is assumed where the technologies disclosed in JP-A No. 210826/1993, in JP-A No. 307002/1995, JP-A No. 84120/1994, and so forth, respectively, are unable to obtain satisfactory effects against even the stray field applied in the perpendicular direction because a member serving as a magnetic shield is disposed at a distance away from the main pole of the head. With a method disclosed in JP-A No. 45008/2003, a shield against the stray field is disposed in the vicinity of the main pole. The shield against the stray field causes the stray field in the perpendicular direction to converge on the shield itself, thereby preventing a decrease in magnetization or demagnetization from occurring to the recording magnetization. As with the other conventional technologies, however, this method does not alleviate the effects of the stray field, directly underneath the respective ends of the auxiliary pole or the read shields.

Thus, the conventional technologies have been developed assuming only the case where the stray field would be applied in the direction perpendicular to the recording medium. Accordingly, under the circumstances where the stray field is applied in every direction, there have remained the problem with either the case of the stray field applied in the perpendicular direction, or the case of the stray field applied in the horizontal direction, so that it has been impossible to protect the device from a decrease in magnetization or demagnetization, occurring to the recording magnetization.

It is therefore a feature of the invention to provide a reliable apparatus for data storage system capable of preventing a decrease in magnetization or demagnetization from occurring to recording magnetization regardless of a direction in which a stray field is applied.

To that end, an apparatus for data storage system according to the invention comprises a magnetic head having a magnetic field shield in the vicinity of a main pole, and a case of the device, having a cover using a material with a high magnetic field shielding effect in the whole or part thereof. The magnetic field shield provided in the magnetic head is formed in a shape optimum for satisfactorily removing the effect of a stray field in a direction perpendicular to a recording medium. Further, either the cover of the device, using the material having the high magnetic field shielding effect, or the cover of the device, using the material having the high magnetic field shielding effect in the part thereof, is formed in a shape optimum for satisfactorily removing the effect of a stray field in the horizontal direction.

By so doing, when the stray field is applied in a direction perpendicular to the recording medium, the magnetic field shield installed in the vicinity of the main pole can shield the magnetic field. Alternatively, the magnetic field is caused to converge on the magnetic field, thereby alleviating the effect of the stray field on the main pole. When the stray field is applied in the horizontal direction in relation to the recording medium, the magnetic field applied to the soft under layer of the recording medium can be caused to take a detour toward the cover, thereby preventing the magnetic field from converging at respective ends of an auxiliary pole, and read shields, and at an end of the magnetic field shield in the vicinity of the main pole. As a result, in the case where a magnetic field is applied in either the perpendicular direction or the horizontal direction, it is possible to prevent a decrease in magnetization or demagnetization from occurring to the recording magnetization due to the effect of the stray field With the invention, occurrence of a decrease in magnetization or demagnetization with respect to recording magnetization due to the stray field can be prevented regardless of a direction in which the stray field is applied, either in the perpendicular direction, or in the horizontal direction.

BRIEF DESCRIPTION OF THE DRAWINGS

FIG. 7 is a diagram showing the effect of the stray field in the horizontal direction, depending on the lengths of the read shields.

FIG. 16 is a schematic view illustrating a state where a stray field converges on the respective ends of an auxiliary pole.

FIG. 17 is a diagram showing the effect of a stray field, directly underneath a main pole, when the stray field is applied.

FIG. 18 is a diagram showing the effects of a stray field, in the vicinity of the main pole, when the stray field is applied.

DETAILED DESCRIPTION OF THE INVENTION

Embodiments of the invention are described hereinafter with reference to the accompanying drawings.

Embodiment 1

Figure 1:
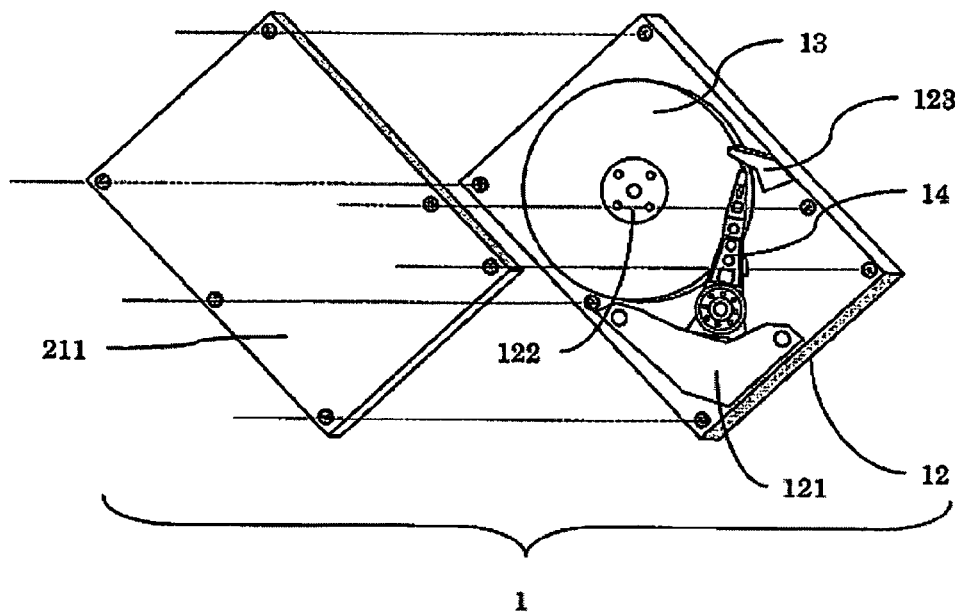
FIG. 1 is a schematic representation showing a first embodiment of a perpendicular magnetic hard-disk drive according to the invention.

FIG. 1 is a schematic representation showing a first embodiment of a perpendicular magnetic hard-disk drive according to the invention. The perpendicular magnetic hard-disk drive 1 comprises a VCM 121, a spindle motor 122, a recording medium 13, a load beam 123, an HSA (Head Stack Assembly) 14, and so forth, disposed on a base 12. Those components are covered with a magnetic cover 211. A head 140 attached to the HSA 14 is a head with enhanced resistance to a stray field in the perpendicular direction.

Figure 2:
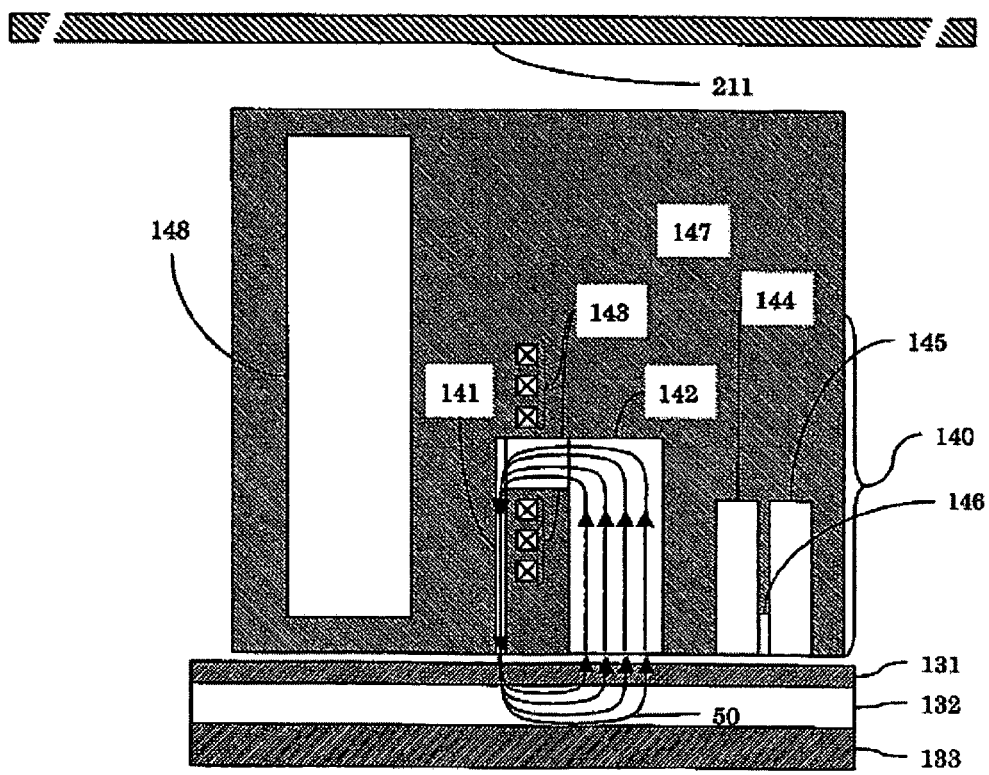
FIG. 2 is a schematic sectional view showing an example of a SPT magnetic head comprising a magnetic field shield.

FIG. 2 is a schematic sectional view showing an example of the head with enhanced resistance to the stray field in the perpendicular direction, mounted in the perpendicular magnetic hard-disk drive 1 as shown in FIG. 1. A magnetic field shield 148 is installed in the vicinity of a main pole 141. The magnetic field shield 148 acts so as to cause the stray field otherwise flowing into the main pole 141 to converge toward the shield side of the head. Accordingly, the stray field is prevented from flowing into the main pole 141, thereby enhancing resistance to the stray field in the perpendicular direction.

With the invention described, the head resistant to the stray field has resistance tailored to the stray field in the perpendicular direction, and is capable of obtaining sufficient resistance to the stray field in the perpendicular direction. In addition, sufficient resistance to the stray field, in the horizontal direction, can be obtained by virtue of the magnetic cover. Referring to FIG. 2, there is described a configuration of the first embodiment comprising the head 140 resistant to the stray field, and the magnetic cover 211, wherein a SPT magnetic head resistant to the stray field, having the magnetic field shield 148, and the magnetic cover 211 are disposed.

FIG. 2 is a view showing the head mounted in the perpendicular magnetic hard-disk drive having the magnetic cover 211. When the stray field in the horizontal direction is applied, the magnetic cover 211 causes a magnetic field applied to the head 140, and the recording medium 13, inside the drive, to converge on the cover 211. Further, when the stray field in the perpendicular direction is applied, the magnetic field shield 148 installed in the vicinity of the main pole 141 causes the stray field flowing into the main pole 141 or an auxiliary pole 142 to converge on the magnetic field shield 148.

With the present embodiment described, the head resistant to the stray field has resistance tailored to the stray field in the perpendicular direction, and is capable of obtaining sufficient resistance to the stray field in the perpendicular direction. In addition, a sufficient resistance to the stray field, in the horizontal direction, can be obtained by virtue of the magnetic cover 211. Resistance to the stray field in the horizontal direction is obtained by means of the magnetic cover 211, and a decrease in magnetization or demagnetization can be prevented from occurring to the recording magnetization, immediately underneath the main pole 141 by obtaining sufficient resistance to the stray field in the perpendicular direction by means of the magnetic field shield 148 installed in the vicinity of the main pole 141.

Embodiment 2

There is described hereinafter a second embodiment of a perpendicular magnetic hard-disk drive comprising a head resistant to a stray field, having a magnetic field shield, and a magnetic cover.

Figure 3:
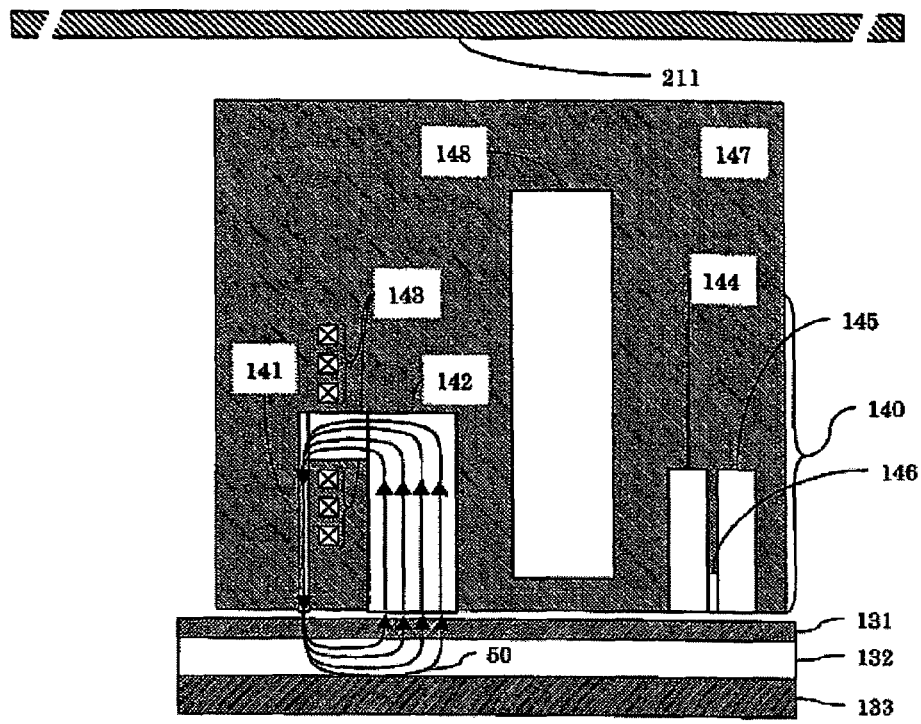
FIG. 3 a schematic sectional view showing a configuration example of a head comprising a magnetic field shield disposed between a main pole and read shields according to a second embodiment of the invention.

FIG. 3 is a schematic sectional view showing a head mounted in a perpendicular magnetic hard-disk drive having a magnetic cover 211. When the stray field in the horizontal direction is applied, the magnetic cover 211 causes a magnetic field applied to a head installed at an HSA 14, and a recording medium 13, inside the device, to converge on the cover. Further, when the stray field in the perpendicular direction is applied, a magnetic field shield 148 disposed between a write-head and a read-head causes the stray field flowing into a main pole 141 or an auxiliary pole 142 to converge on the magnetic field shield. Further, a magnetic field flowing into upper and lower read shields 144, 145 also can be similarly converged on the magnetic field shield 148.

With the present embodiment described, resistance to the stray field in the horizontal direction is obtained by means of the magnetic cover 211, and against the stray field in the perpendicular direction, it is possible to prevent a decrease in magnetization or demagnetization from occurring to recording magnetization, immediately underneath not only the main pole/auxiliary pole 141, 142 but also the read shields 144, 145 by means of the magnetic field shield 148 installed in the magnetic head 140.

Embodiment 3

Figure 4:
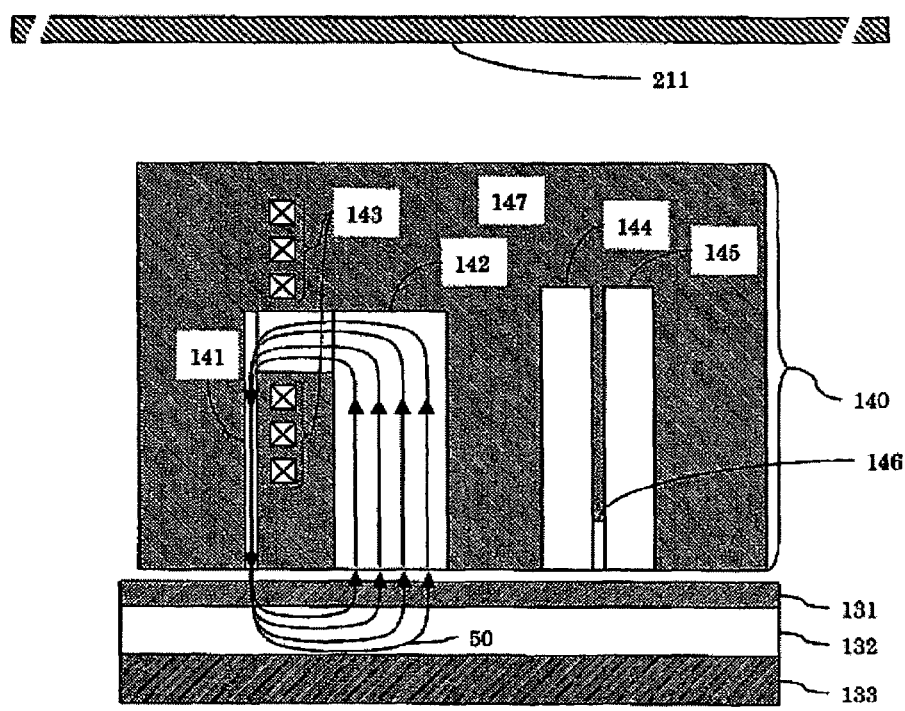
FIG. 4 is a schematic sectional view showing a configuration example of a head, wherein the read shields are long in the perpendicular direction illustrating aspects of a third embodiment of the invention.
Figure 5:
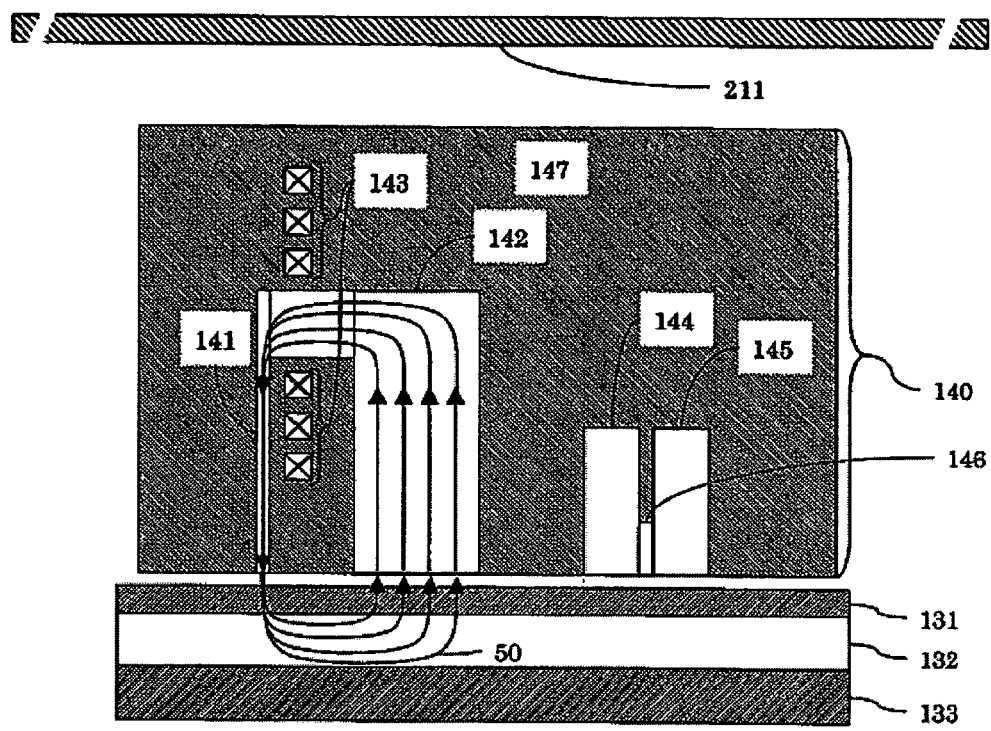
FIG. 5 is a schematic sectional view showing a configuration example of a head, wherein the read shields are short in the perpendicular direction illustrating aspects of a third embodiment of the invention.

A configuration of a head having shields short in length, in the perpendicular direction, is described hereinafter as a third embodiment of the invention. FIGS. 4 and 5 are schematic sectional views each showing a head mounted in a perpendicular magnetic hard-disk drive having a magnetic cover 211. FIG. 4 shows a configuration wherein upper and lower read shields 144, 145 are long in the direction of an element height, and FIG. 5 shows a configuration wherein the upper and lower read shields 144, 145 are short in the direction of the element height. The head shown in FIG. 4 is the same in configuration as the head shown in FIG. 5 except that respective lengths of the upper and lower read shields 144, 145, in FIG. 4, differ from those in FIG. 5.

Figure 6:
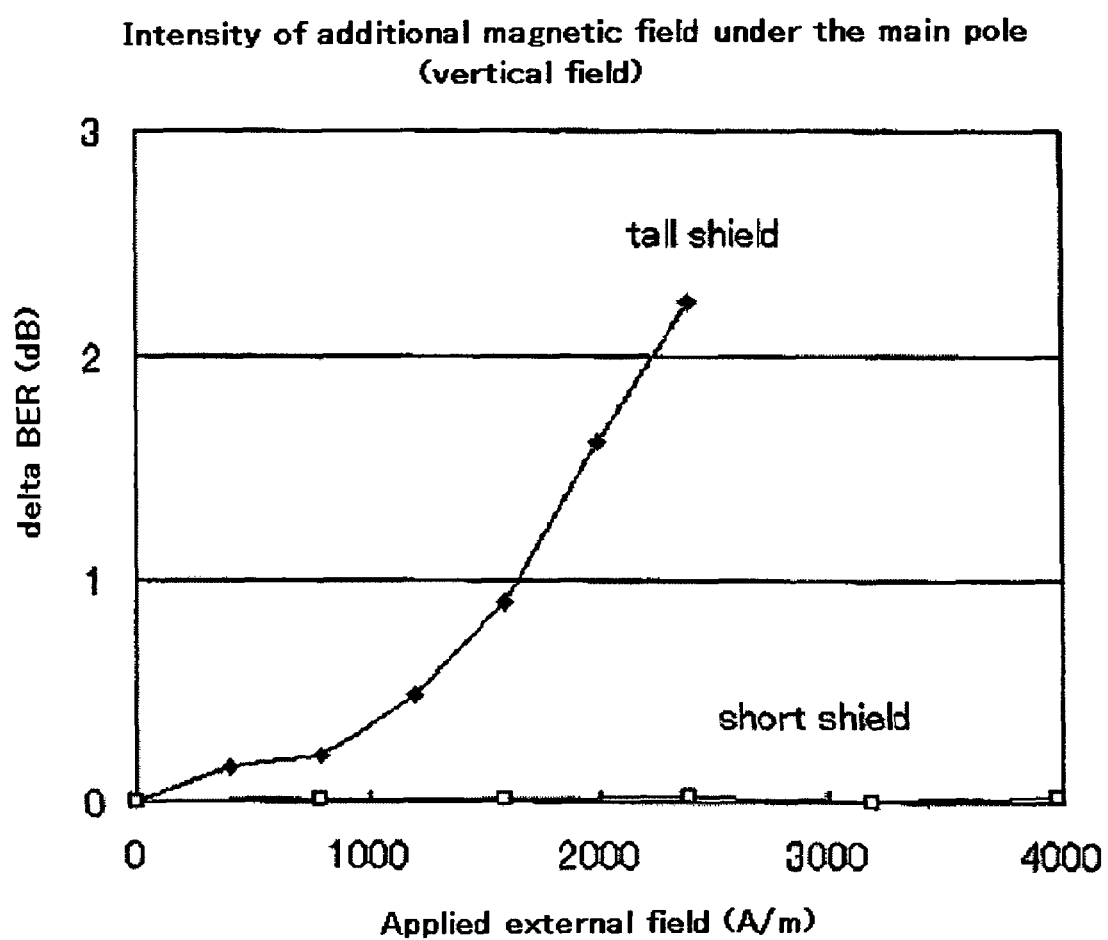
FIG. 6 is a diagram showing the effect of a stray field in the perpendicular direction, depending on the lengths of the read shields.

FIGS. 6 and 7 show difference in the effect of a stray field, due to difference in the lengths of the read shields, respectively. A main pole 141 is in a shape 170 nm in width on a face of the head used in this case, opposite to a medium, and 210 nm in length while an auxiliary pole 142 as well as the upper and lower read shields 144, 145 are in a shape 32 μm wide and 2.5 μm long, respectively. As to height from an air bearing surface, the auxiliary pole has the height 16 μm, the long one of the read shields has the height 16 μm, and the short one thereof has the height 6 μm.

In the case of the read shields being long, deterioration in error rate of the perpendicular magnetic field, directly underneath the main pole, increases as shown in FIG. 6, however, deterioration in error rate of the horizontal magnetic field, at respective ends of the auxiliary pole and the read shields, becomes very small as shown in FIG. 7(A). In contrast, in the case of the read shields being short, the error rate of the perpendicular magnetic field, directly underneath the main pole, undergoes substantially no deterioration as shown in FIG. 6, however, deterioration in error rate of the horizontal magnetic field, at the respective ends of the auxiliary pole and the read shields, becomes very large as shown in FIG. 7(B).

In this connection, whether the read shields are long or short is determined on the basis of the auxiliary pole. More specifically, if the lengths of the read shields are equivalent to, or longer than that of the auxiliary pole, the read shields are defined as long ones, and if the lengths of the read shields are shorter than that of the auxiliary pole, the read shields are defined as short ones. However, in order to obtain satisfactory results, the read shields are preferably lower in height than about half the auxiliary pole.

With the present embodiment described, it is apparent that resistance to the stray field in the horizontal direction is obtained by means of the magnetic cover 211, and by use of a head having the read shields 144, 145 short in the perpendicular direction, it is possible to cope with the stray field in the perpendicular direction, while it is possible to cope with the stray field in the horizontal direction by use of the cover 211 of the device.

Embodiment 4

Figure 8:
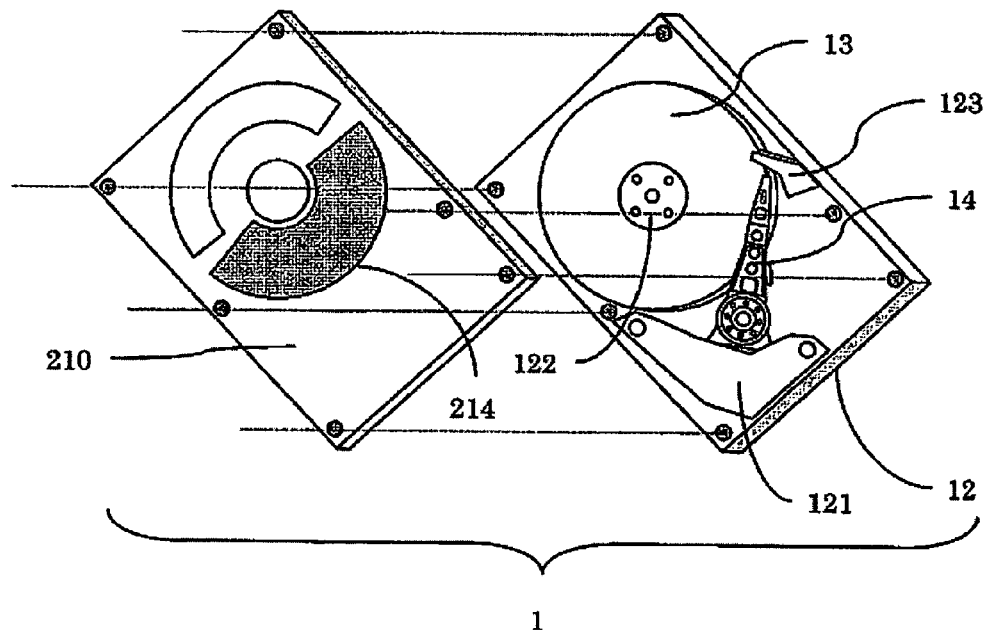
FIG. 8 is a schematic representation showing a cover using a magnetic shielding member disposed at a part thereof according to a fourth embodiment of the invention.

There is described hereinafter a configuration wherein a magnetic component is used at a part of a cover as a fourth embodiment of the invention with reference to FIG. 8. FIG. 8 is a schematic representation showing the fourth embodiment of a perpendicular magnetic hard-disk drive according to the invention. The perpendicular magnetic hard-disk drive in FIG. 8 differs from the perpendicular magnetic hard-disk drive shown in FIG. 1 only in that the magnetic component is used at a part of the cover. More specifically, with the present embodiment, use is made of an aluminum cover 210 provided with a magnetic patch 214 for the cover. With the perpendicular magnetic hard-disk drive according to the present embodiment, when a stray field in the horizontal direction is applied, a magnetic field applied to a head installed at an HSA 14, and a recording medium 13, inside the device, can be caused to converge on the magnetic patch 214 of the cover. As a result, the stray field applied in the horizontal direction does not converge in a soft under layer of the recording medium 13. Further, the head installed at the HSA 14 inside the device is the head with the enhanced resistance to the stray field, shown in FIG. 2 or FIG. 3, so that the effects of the stray field in the horizontal direction can be alleviated.

Figure 9:
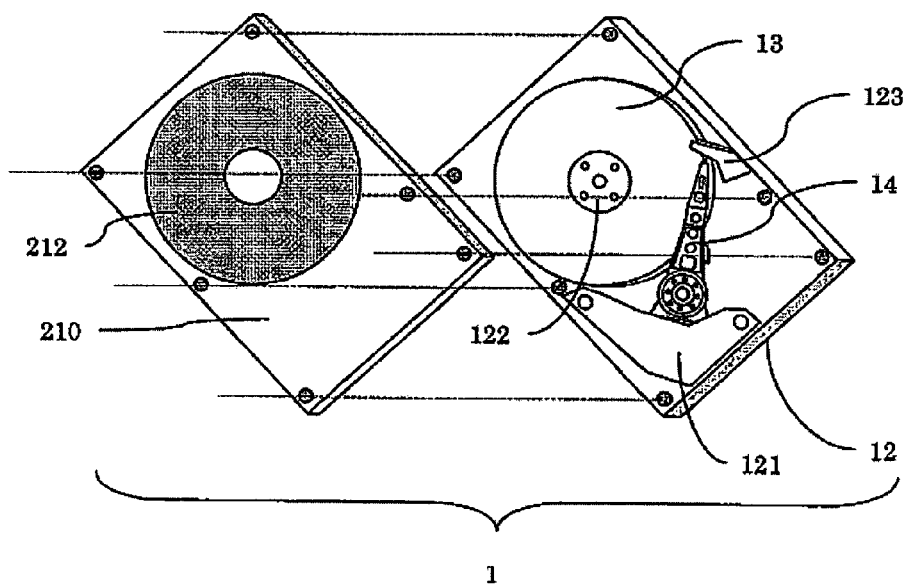
FIG. 9 is a schematic representation showing a cover using a magnetic shielding member disposed at a part thereof.
Figure 10:
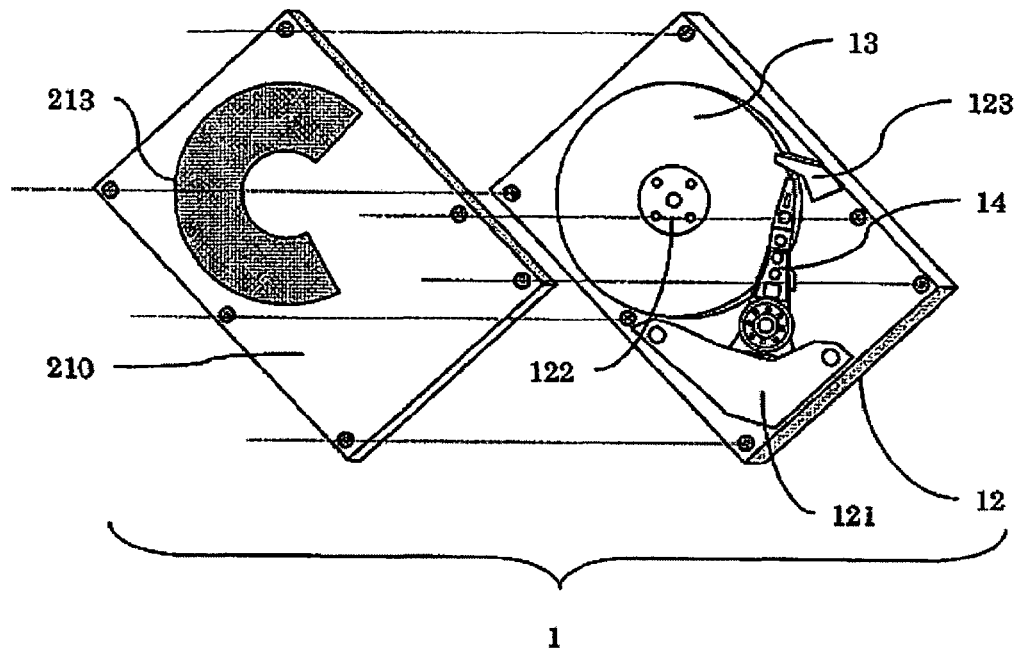
FIG. 10 is a schematic representation showing a cover using a magnetic shielding member, in a shape resembling the letter "C".

As the magnetic component provided at the part of the cover, a magnetic component 212 in a shape matching the shape of the medium may be installed on a face of the cover, opposite to the medium, as shown in FIG. 9. Otherwise, a magnetic component 213 in a shape resembling the letter "C" may be installed as shown in FIG. 10.

With the present embodiment described, the path of the magnetic field, leading from the soft under layer 132, and returning thereto again via the auxiliary pole 142 or the upper and lower read shields 144, 145, as shown in FIG. 16, becomes weaker, so that a decrease in magnetization or the demagnetization can be prevented from occurring to the recording magnetization, directly underneath the respective ends of the auxiliary pole 142 and the upper and lower read shields 144, 145.

Figure 11:
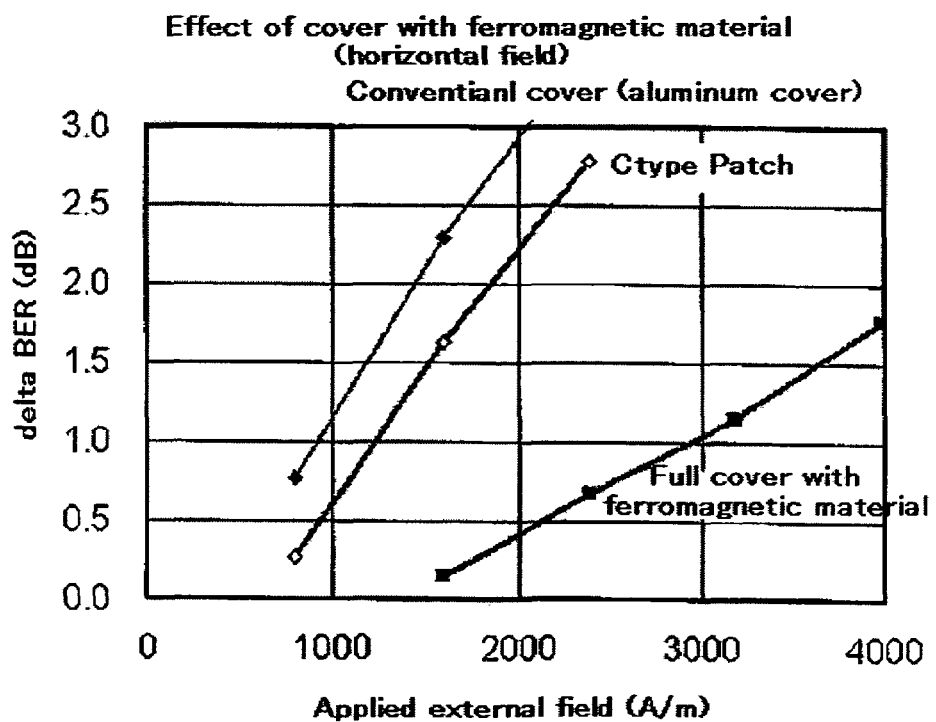
FIG. 11 is a diagram showing deterioration in error rate, depending on the shape of a cover, when a horizontal magnetic field is applied.

Now, referring to FIG. 11, there are described hereinafter the respective effects of the first and fourth embodiments as the representative ones of those embodiments described in the foregoing. In FIG. 11, deterioration in error rate is checked by varying the strength of the stray field applied. The cover for the whole surface according to the first embodiment is a steel sheet 0.4 mm thick, and the cover according to the fourth embodiment is the aluminum cover with a C-shaped patch 0.6 mm thick attached thereto. FIG. 11 shows an error rate measured before applying a magnetic field, and an error rate measured by removing the magnetic field after writing for about 5 minutes while applying the magnetic field, using HDDs with the respective covers installed thereon. Spots where the error rates were measured are the respective ends of the auxiliary pole, and the upper and lower read shields, and in FIG. 11, there are shown data at the spots where deterioration in error rate was at the maximum. The data indicate that when a magnetic field of 1591.55 A/m (=20 Oe) is applied, the effect of the stray field is alleviated with the use of the cover for the whole surface by not less than about 90% against that in the case of using the normal aluminum cover, and with the use of the cover with the C-shaped patch attached thereto by about 25% against that in the case of using the normal aluminum cover.

Embodiment 5

Next, there is described hereinafter a configuration of a perpendicular magnetic hard-disk drive according to a fifth embodiment of the invention, wherein a magnetic field shielding member does not exist on a face, opposite to a moving range of a head, with reference to FIG. 12.

Figure 12:
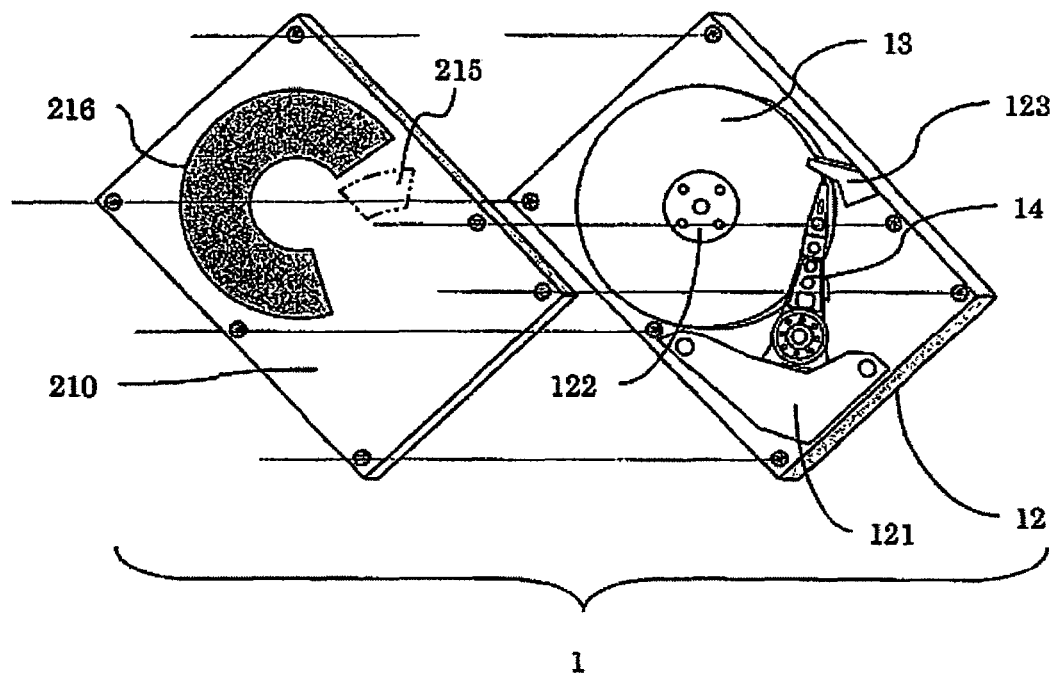
FIG. 12 is a schematic representation showing a cover with a configuration wherein a magnetic shielding member not present over a moving range of a head is disposed at a part of the cover according to the fifth embodiment of the invention.
Figure 13:
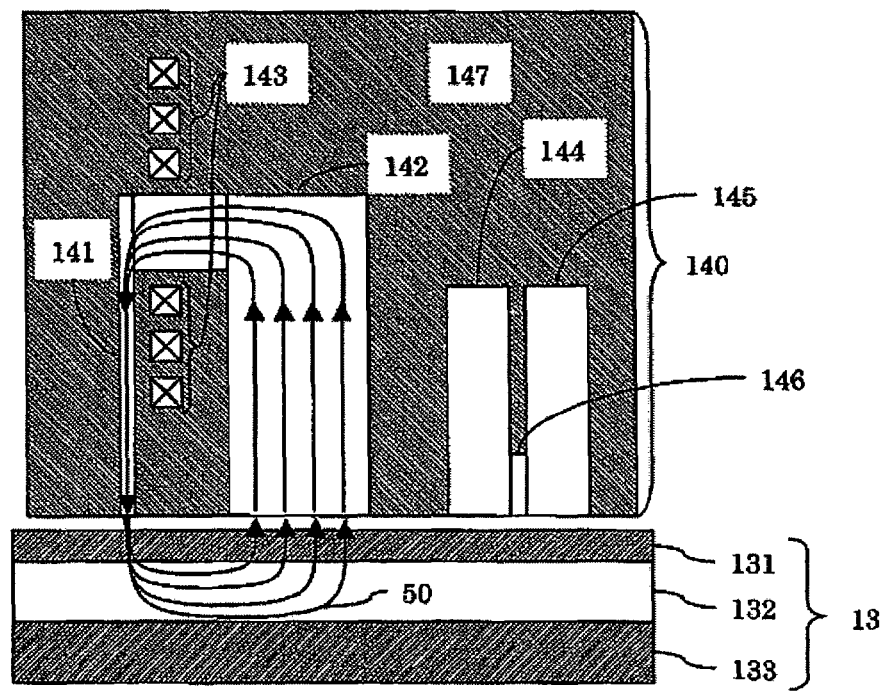
FIG. 13 is a schematic representation for illustrating a perpendicular magnetic recording system.
Figure 14:
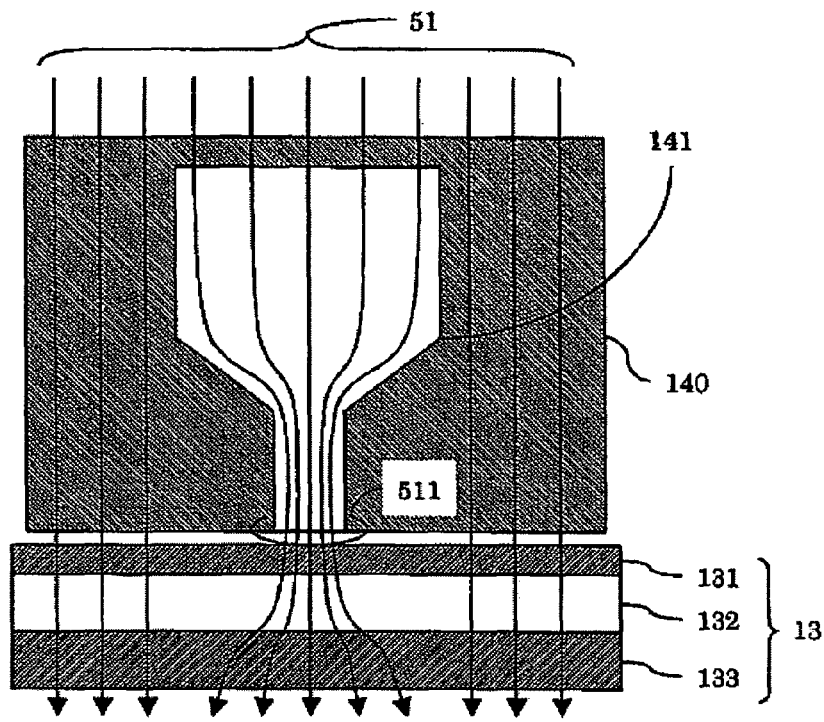
FIG. 14 is a schematic representation for illustrating a state where a stray field converges on the tip of a main pole.
Figure 15:
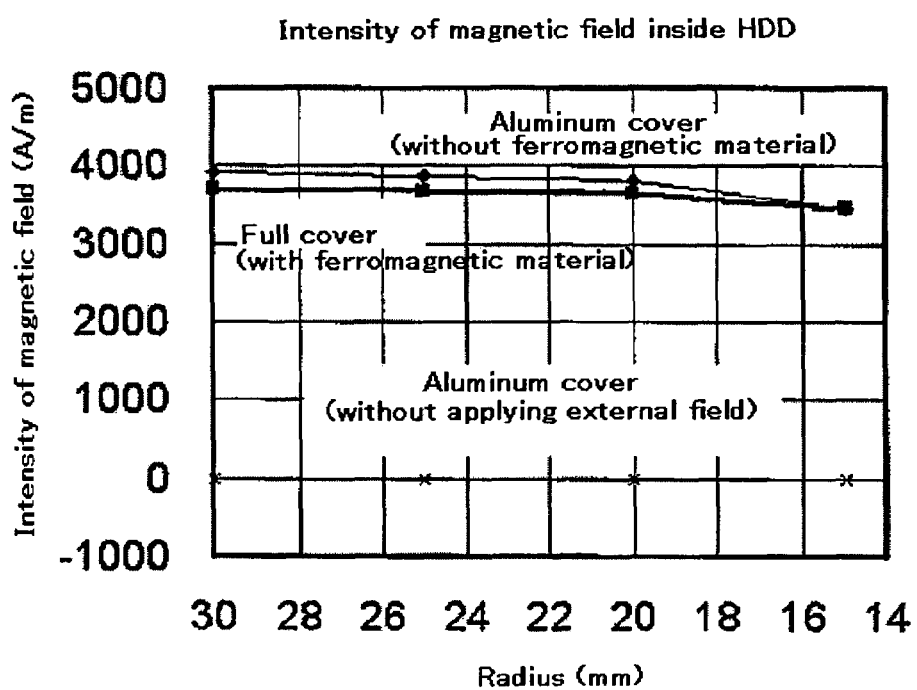
FIG. 15 a diagram showing the effect of a cover, depending on the configuration of the cover, when a horizontal magnetic field is applied.
Figure 1:
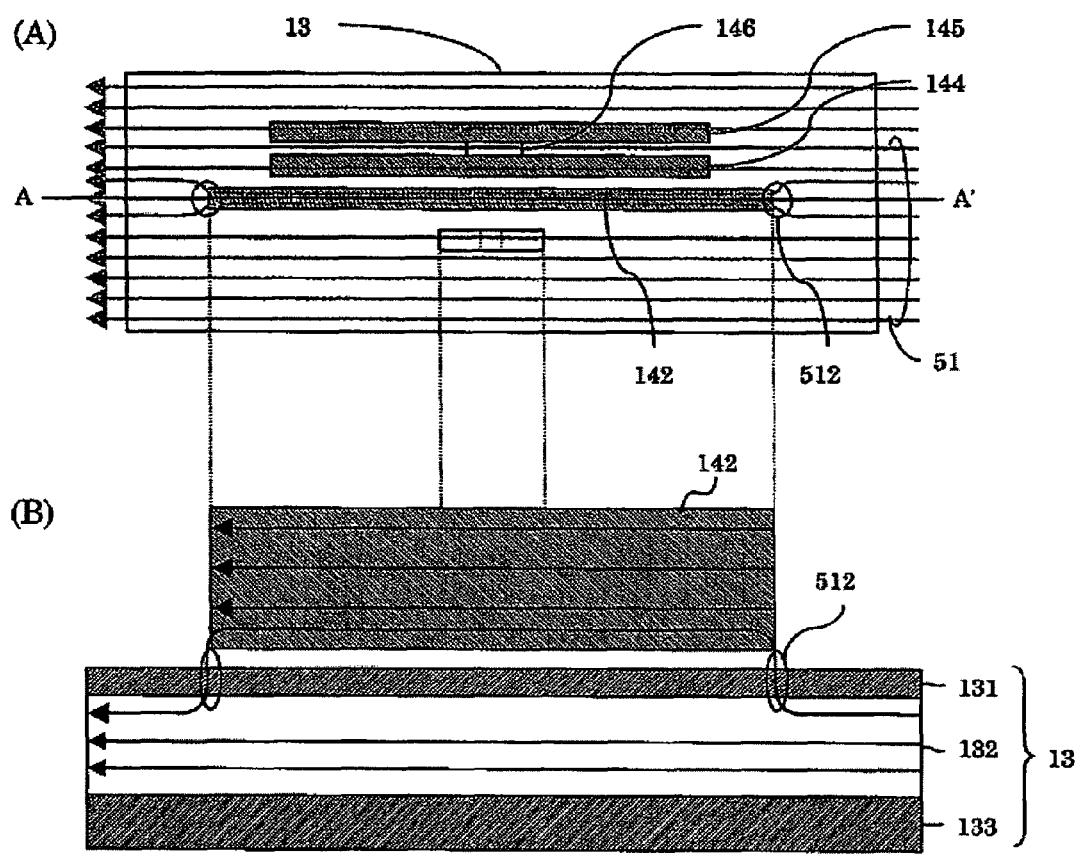

FIG. 12 shows the configuration that is the same as the configuration shown in FIG. 1 except that the cover is an aluminum cover 210 provided with a magnetic patch 216 fabricated so as not to be present over a moving range 215 of the head. When a stray field in the horizontal direction is applied, the magnetic patch 216 can cause a magnetic field applied to the head installed at an HSA 14, and a recording medium 13, inside the device, to converge on the cover. The magnetic patch 216 acts as an antenna for the magnetic field because of the shape thereof, thereby causing the stray field to converge on the ends thereof. Accordingly, as the stray field is caused to converge around the head, there is a possibility of increasing the strength of the magnetic field in the vicinity of the head. For this reason, by disposing the magnetic patch 216 so as not to be present over the moving range 215 of the head, the effect of the stray field on the magnetic field can be alleviated.

Since the magnetic patch 216 is not present over the moving range 215 of the head as described, the stray field applied in the horizontal direction converges neither in a soft under layer of a recording medium 13 nor on the head resistant to the stray field. Further, as the head installed at the HSA 14 inside the device is the head resistant to the stray field, which can alleviate the effect of the stray field in the perpendicular direction.

With the present embodiment described, the path of the magnetic field, leading from the soft under layer 132, and returning thereto again via the auxiliary pole 142 or the upper and lower read shields 144, 145, as shown in FIG. 16, becomes weaker, so that a decrease in magnetization or the demagnetization can be prevented from occurring to the recording magnetization, directly underneath the respective ends of the auxiliary pole 142 and the upper and lower read shields 144, 145.

An example of the fifth embodiment, wherein the magnetic patch is in the shape resembling the letter "C" as shown in FIG. 10, and is not present over the moving range of the head as described in the fifth embodiment, also can be implemented by embedding a magnetic component in a cavity formed to provide the normal aluminum cover with rigidity, so that the present invention can be implemented by applying a minor variation in shape to the conventional cover.

With the present invention, the first through third embodiments are not incompatible with the fourth embodiment or the fifth embodiment, and the first through third embodiments can be suitably combined with the fourth embodiment or the fifth embodiment, respectively.

It is to be pointed out that the invention is not limited to the embodiments described hereinbefore, and that obviously changes and variations may be made without departing from the spirit and scope of the invention. For example, in the foregoing description, use is made of the disk of a structure wherein the magnetic field shield is recessed from the air bearing surface (ABS), in FIGS. 2 and 3, however, use may be made of a head of a structure wherein the magnetic field shield is not recessed. In this case, a structure contributing to enhancement in resistance to the stray field is sufficient. Further, in FIGS. 2 and 3, the magnetic field shield is disposed at a position close to the main pole; however, the magnetic field shield can be installed at a position on a straight line between the main pole, and the reading element, and farther away from the main pole than from the reading element provided the position is within a range where satisfactory results can be obtained.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. An apparatus for data storage system comprising:
   a perpendicular recording medium having a soft under layer and recording layer;
   a magnetic head having a main pole, an auxiliary pole, a pair of upper and lower read shields, and a magneto-resistive element sandwiched between the pair of the upper and lower read shields; and
   a case of housing the perpendicular recording medium and the magnetic head,
   wherein the magnetic head further comprises a magnetic shield that shields a stray field applied in a direction perpendicular to the surface of the perpendicular recording medium, and the case comprises a cover (including ferromagnetic material) made of a constituent material having a magnetic field shielding effect.

2. An apparatus for data storage system according to claim 1, wherein the magnetic shield is disposed on a side of the main pole and the auxiliary pole apposite from the pair of upper and lower read shields.

3. An apparatus for data storage system according to claim 1, wherein the magnetic shield is disposed in an intermediate location with the main pole and the auxiliary pole on one side and the pole of upper and lower read shields on an opposite side from the main pole and the auxiliary pole.

4. An apparatus for data storage system according to claim 1, wherein the cover of the case is a magnetic cover.

5. An apparatus for data storage system according to claim 1, wherein the pair of upper and lower read shields are lower in height than the auxiliary pole.

6. An apparatus for data storage system according to claim 5, wherein the pair of upper and lower read shields are lower in height than about half the height of the auxiliary pole.

7. An apparatus for data storage system according to claim 1, wherein the cover of the case comprises a magnetic field shielding member provided at a part thereof.

8. An apparatus for data storage system according to claim 7, wherein the magnetic field shield member of the cover has a shape matching the shape of the perpendicular recording medium.

9. An apparatus for data storage system according to claim 7, wherein the magnetic field shield member of the cover has a "C" shape.

10. An apparatus for data storage system according to claim 7, wherein the magnetic field shielding member is provided in the a region of the cover not overlapping a moving range of the magnetic head.

11. An apparatus for data storage system according to claim 7, wherein the magnetic field shielding member is disposed such that ends thereof are positioned outside of a region of the cover overlapping a moving range of the magnetic head.

12. An apparatus for data storage system comprising:
   a perpendicular recording medium having a soft under layer and a recording layer;
   a magnetic head having a main pole, an auxiliary pole, a pair of upper and lower read shields, and a magneto-resistive element sandwiched between the pair of the upper and lower read shields; and
   a case for housing the perpendicular recording medium and the magnetic head,
   wherein the pair of the upper and lower read shields are long in the horizontal direction, and the case comprises a cover made of a constituent material having a magnetic field shielding effect.

13. An apparatus for data storage system according to claim 12, wherein the magnetic head further comprises a magnetic shield that shields a magnetic field applied in a direction perpendicular to the surface of the perpendicular recording medium.

14. An apparatus for data storage system according to claim 13, wherein the magnetic shield is disposed in an intermediate location with the main pole and the auxiliary pole on one side and the pole of upper and lower read shields on an opposite side from the main pole and the auxiliary pole.

15. An apparatus for data storage system according to claim 13, wherein the cover of the case is a magnetic cover.

16. An apparatus for data storage system according to claim 13, wherein the cover of the case comprises a magnetic field shielding member provided at a part thereof.

17. An apparatus for data storage system according to claim 16, wherein the magnetic field shield member of the cover has a shape matching the shape of the perpendicular recording medium.

18. An apparatus for data storage system according to claim 16, wherein the magnetic field shield member of the cover has a "C" shape.

19. An apparatus for data storage system according to claim 16, wherein the magnetic field shielding member is provided in the a region of the cover not overlapping a moving range of the magnetic head.

20. An apparatus for data storage system according to claim 16, wherein the magnetic field shielding member is disposed such that ends thereof are positioned outside of a region of the cover overlapping a moving range of the magnetic head.

* * * * *